United States Patent [19]

Gassen et al.

[11] Patent Number: 5,016,355

[45] Date of Patent: May 21, 1991

[54] VIBRATION REDUCING CHAIN SAW HANDLE

[75] Inventors: James R. Gassen; Lakhbir S. Suchdev, both of Charlotte, N.C.

[73] Assignee: Textron Inc., Providence, R.I.

[21] Appl. No.: 544,200

[22] Filed: Jun. 25, 1990

[51] Int. Cl.[5] .............................................. B23D 57/02

[52] U.S. Cl. .................................... 30/383; 173/162.1

[58] Field of Search .................................. 30/381-387; 173/162 H

[56] References Cited

U.S. PATENT DOCUMENTS

| | | | |
|---|---|---|---|
| 3,368,595 | 2/1968 | Gutjahr | 143/32 |
| 3,496,971 | 2/1970 | Hale | 143/32 |
| 3,620,269 | 11/1971 | Lange | 143/32 |
| 3,637,029 | 1/1972 | Sherwood, Jr. et al. | 173/162 |
| 3,651,839 | 3/1972 | Stihl et al. | 143/32 |
| 3,698,455 | 10/1972 | Frederickson et al. | 143/32 |
| 3,700,015 | 10/1972 | Kobayashi et al. | 143/32 |
| 3,728,793 | 4/1973 | Makinson et al. | 30/383 |
| 3,772,784 | 11/1973 | Heermann | 30/382 |
| 3,823,474 | 7/1974 | Ionescu | 30/383 |
| 3,845,827 | 11/1974 | Schulin | 173/162 |
| 3,889,763 | 6/1975 | Dillon | 173/162 |
| 3,934,344 | 1/1976 | Inaga | 30/381 |
| 3,945,119 | 3/1976 | Nagashima et al. | 30/383 |
| 3,972,119 | 8/1976 | Bailey | 30/381 |
| 4,010,544 | 3/1977 | Siman | 30/381 |
| 4,059,895 | 11/1977 | Hirschkoff | 30/382 |
| 4,135,301 | 1/1979 | Hoeppner | 30/381 |
| 4,138,812 | 2/1979 | Zimmerer et al. | 30/381 |
| 4,141,143 | 2/1979 | Hirschoff et al. | 30/381 |
| 4,219,932 | 9/1980 | Nagashims et al. | 30/381 |
| 4,296,553 | 10/1981 | Dirks et al. | 30/381 |
| 4,401,167 | 8/1983 | Sekizawa et al. | 173/162 |
| 4,411,071 | 10/1983 | Takahashi et al. | 30/381 |
| 4,670,985 | 6/1987 | Biersteker | 30/381 |
| 4,693,006 | 9/1987 | Wehle | 30/383 |
| 4,749,049 | 6/1988 | Greppmair | 173/162 |
| 4,785,540 | 11/1988 | Arvidsson | 30/520 |
| 4,805,308 | 2/1989 | Ritola | 30/382 |
| 4,896,426 | 1/1990 | Hagashima | 30/383 |
| 4,964,217 | 10/1990 | Siede et al. | 30/383 |

*Primary Examiner*—Douglas D. Watts
*Attorney, Agent, or Firm*—Perman & Green

[57] ABSTRACT

A chain saw having a resilient deflectable rear handle. The rear handle is connected to a housing of the chain saw at a first end and has a second end that is cantilevered. A portion of the housing is suitably sized, shaped and positioned relative to the rear handle second end to form a deflection overload constraint to prevent the rear handle from deflecting too much. The cantilevered configuration of the rear handle and its deflectability allow vibrations generated during operation of the chain saw to be reduced at an operator's grasping location on the rear handle.

16 Claims, 2 Drawing Sheets

VIBRATION REDUCING CHAIN SAW HANDLE

BACKGROUND OF THE INVENTION

1. Field of the Invention

The present invention relates to hand-held power tools and, more particularly, to a chain saw having an improved rear handle for reducing vibrations to an operator's hand.

2. Prior Art

U.S. Pat. No. 4,296,553 to Dirks et al. discloses a chain saw with a grip and housing that has a projection that serves as an overload protection for its vibration dampening element. U.S. Pat. No. 4,010,544 to Siman appears to disclose a chain saw with a rear handle integral with a one piece molded saw housing. U.S. Pat. No. 3,889,763 to Dillon discloses a chain saw with a rear handle with one end rigidly secured to its frame, a second end also rigidly secured to the frame, and a third end with an aperture in spaced relationship to a pin connected to the frame. The second end portion is relatively thin and thus can flex to absorb vibrations. The third end portion is relatively thick and thus acts to prevent overstress. Other various vibration reduction systems are also well known in the art. The principal method and system of vibration reduction in prior art tools has been with the use of elastomeric isolators and springs between the handle and body of the tool. However, most of these systems in the prior art are relatively complex and require the assembly of many parts to manufacture. The relatively numerous parts and substantially manufacturing time needed to assemble these parts adds to the cost of manufacture.

It is therefore an objective of the present invention to provide a new and improved relatively simple vibration reducing handle for a power tool that can overcome the disadvantages of the prior art.

SUMMARY OF THE INVENTION

The foregoing problems are overcome and other advantages are provided by a housing for a hand-held power tool having a cantilevered deflectable handle for reducing vibrations to an operator's hand.

In accordance with one embodiment of the present invention, a chain saw having a motor, a saw chain, a chain guide and a housing is provided. The housing comprises a first body section and a second rear handle section. The first body section substantially surrounds the motor of the chain saw. The second rear handle section has a bottom portion, a cantilevered top portion, and means for limiting deflection of the top portion. The top portion has a first end fixedly connected to the first body section and a relatively free cantilevered second end. The bottom portion is fixedly connected to the first body section. The means for limiting deflection of the top portion comprises the top portion second end and the bottom portion being suitably positioned relative to each other and being suitably sized and shaped to allow only limited movement of the top portion second end relative to the bottom to thereby limit deflection of the top portion second end relative to a home position.

In accordance with another embodiment of the present invention, a chain saw having a motor, a saw chain, a chain guide and a housing forming a rear handle is provided. The improvement comprises the rear handle having a relatively fixed first end and a cantilevered second end. The second end has a portion cooperable with a portion of the housing for a limited but relatively free movement therein in at least two directions such that the second end is relatively free to deflect from a home position to at least partially reduce vibrations to an operator's hand grasping the rear handle and, upon contact of the second end with the housing, excessive deformation of the rear handle is prevented to prevent damage to the rear handle whereby the rear handle is relatively simple and inexpensive to manufacture and assemble and, also provides reduction of vibrations to the hand of an operator.

In accordance with another embodiment of the present invention a housing for use in a hand-held power tool having a motor is provided. The housing is comprised of a molded polymer material and generally comprises a body section, a rear handle, and means for limiting deformation of the rear handle. The body section is provided for substantially surrounding the motor of the chain saw. The rear handle is fixedly connected to the body section at a first end and has a relatively free cantilevered second end. The means for limiting deformation of the rear handle comprises the second end and a portion of the body section being suitably positioned relative to each other and being suitably sized and shaped to provide for a relative limited movement therebetween such that deflection of the second end relative to a first position has a predetermined limit to limit deformation of the rear handle and, the cantilevered configuration of the rear handle allows vibrations generated during operation of the tool to be reduced at an operator's grasping location on the rear handle.

BRIEF DESCRIPTION OF THE DRAWINGS

The foregoing aspects and other features of the invention are explained in the following description, taken in connection with the accompanying drawings, wherein.

FIG. **6*a*** is a partial cross-sectional view of an alternate embodiment of the present invention.

Figure 6A:
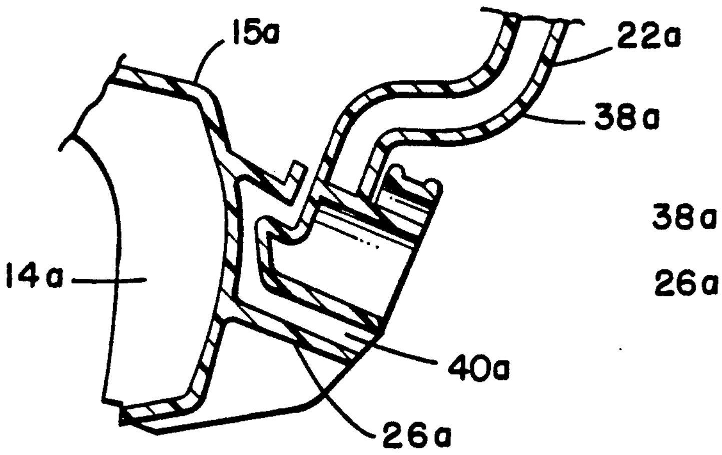

FIG. **6*b* is a partial rear plan view of the embodiment shown in FIG. 6*a***.

Figure 7:
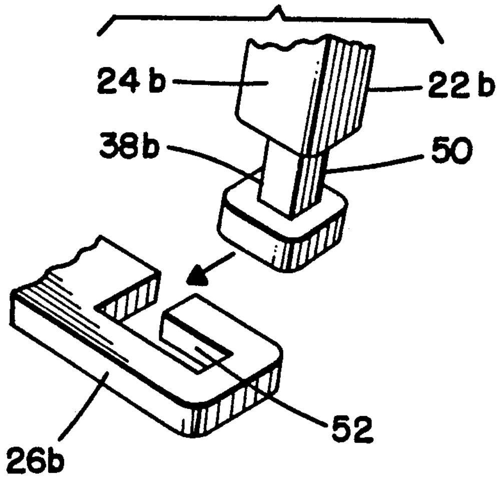

FIG. 7 is a partial perspective exploded view of an alternate embodiment of the present invention.

Figure 8:
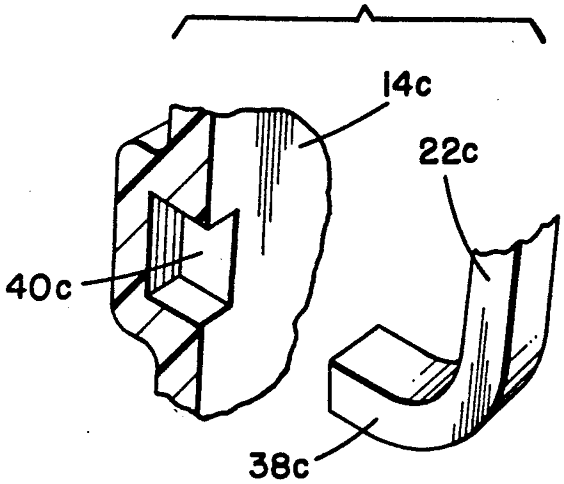

FIG. 8 is a partial exploded and cross sectional view of an alternate embodiment of the present invention.

DETAILED DESCRIPTION OF THE INVENTION

Figure 1:
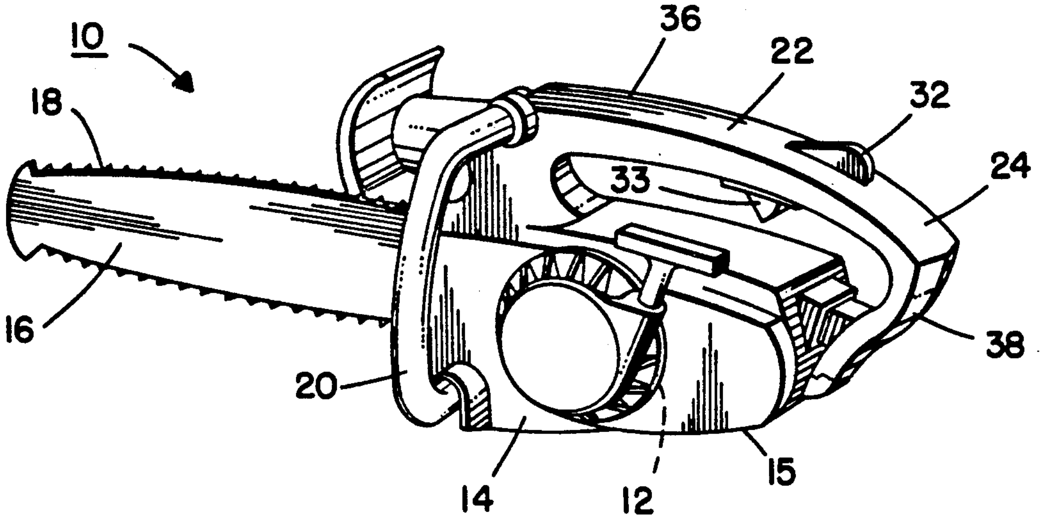
FIG. 1 is a perspective view of a chain saw incorporating features of the present invention.

Referring to FIG. 1, there is shown a perspective view of a chain saw 10 incorporating features of the present invention. Although the present invention is being described with reference to the chain saw shown in FIG. 1, it should be understood that the present invention can be incorporated into any suitable type of hand-held power tool. In addition, it should also be understood that any suitable size, shape or type of materials and elements may be used in the manufacture and construction of the present invention as will be described below.

The chain saw 10 shown in FIG. 1 generally comprises a motor 12, a housing 14, a chain guide bar 16 and a saw chain 18. The motor 12, in the embodiment shown, is comprised of a two stroke single cylinder internal combustion engine. However, the motor 12 may be provided as a suitable electric motor. The motor 12 has suitable means to drive the saw chain 18 on the chain guide bar 16 as is known in the art. The housing motor 12 is substantially encased and surrounded by the housing 14 which has a front handle 20 connected thereto. The housing 14 may be comprised of any suitable material. However, in a preferred embodiment the housing 14 is comprised of a suitable molded plastic or polymer material such as glass reinforced nylon or filled nylon. In the embodiment shown, the housing 14 in addition to functioning as a housing for the motor 12, also functions as a second or rear handle 22. Thus, the housing 14 generally has a main section 15 and rear handle 22. The main section 15 is preferably comprised of two members that are attached to each other as half sections to enclose the motor 12. However, the main section 15 can be comprised of any suitable number of members. In a preferred embodiment of the invention, at least a portion of the rear handle 22 is integrally formed with at least a portion of the main section 15. However, the rear handle 22 can also be provided as a totally separate member that is fixedly attached to the main section 15 at its front end 36 as will be described below.

Figure 2:
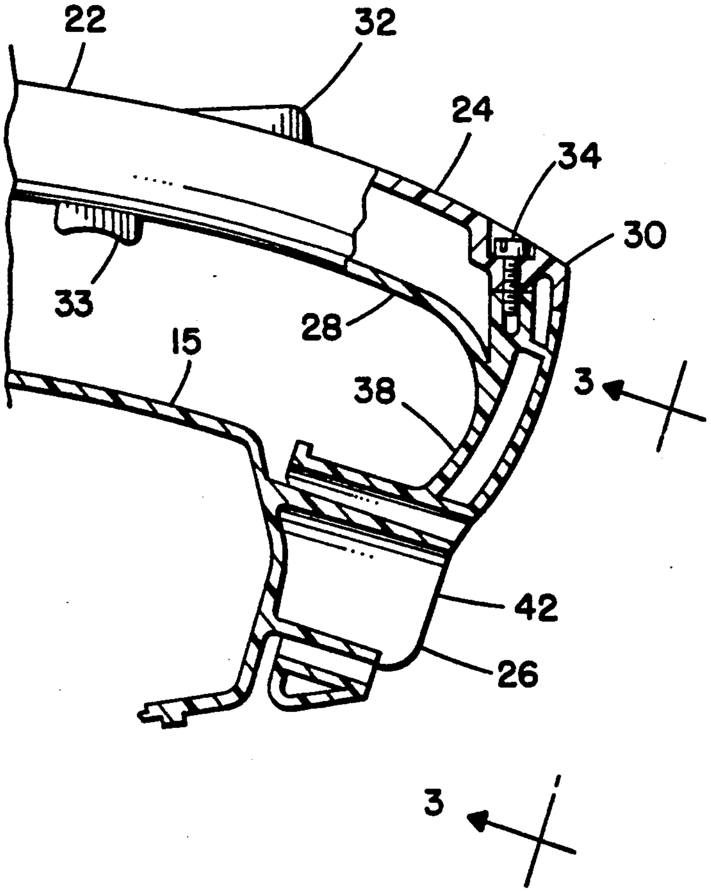
FIG. 2 is a partial cross sectional view of a portion of the chain saw rear handle ,and housing of the chain saw shown in FIG. 1.
Figure 3:
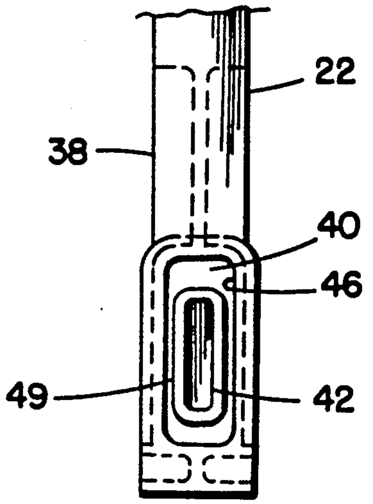
FIG. 3 is a partial plan rear view of the rear handle shown in FIG. 2 taken view 3—3.

Referring also to FIGS. 2 and 3, in the embodiment shown, the rear handle 22 is comprised of a top portion 24 and a bottom portion 26. The top portion 24, in the embodiment shown, is comprised of a first bottom piece 28 and second top piece 30. This two piece configuration of the top portion 24 is primarily provided such that control levers 32 and 33 can be suitably manufactured and located in the top portion 24 and mechanics such as control cables or electrical wires can pass through the relatively hollow top portion 24 to the motor 12. Suitable screws 34 are provided to fixedly mount the top piece 30 to the bottom piece 28. The bottom piece 28 of the top portion 24 is preferably integrally formed with at least one piece or section of the housing main section 15. However, the bottom piece 28 of top portion 24 may be separately manufactured and fixedly connected to the housing 14 as will be described below. The top and bottom pieces 28 and 30 can also be provided as a single unitary integrally formed member if so desired. In the embodiment shown, the top portion 24 generally comprises a first forward end 36 and a second rearward end 38. The first forward end 36 is fixedly connected to the housing 14 either by being at least partially integrally formed therewith or being fixedly attached thereto by screws or the like. As the top portion 24 extends away from the first forward end 36 towards the second rearward end 38 it is substantially spaced from the remainder of the chain saw 10 for an operator to use the rear handle 22 as a grasping location and forms a cantilever type profile. The second rearward end 38 is not attached or connected to the housing 14 except through the first end 36. Instead, the second rearward end 38 is relatively free to deflect in a cantilever-type fashion with the top portion 24 resiliently deforming or deflecting.

The second rearward end 38, in the embodiment shown, generally comprises a deflection constraint channel 40. The bottom portion 26 of the rear handle 22, in the embodiment shown, is integrally formed with the main section 15 of the housing 14 and generally comprises a protrusion 42. In the embodiment shown, the protrusion 42 and the deflection constraint channel 40 are adapted to act as means for limiting deflection of the top portion 24. The deflection constraint channel 40 and protrusion 42 are suitably positioned relative to each and are suitably sized and shaped to allow only limited movement of the top portion second end 38 relative to the bottom portion 26 to thereby limit deflection of the top portion second end 38 relative to the home position as shown in FIG. 3. To accomplish this, the protrusion 42 extends into the deflection constraint channel 40. In a preferred embodiment, the portion of the main section 15 that has the protrusion 42 extending therefrom is integrally formed with the top portion bottom member 28. Since the housing 14 is comprised of a suitable partially resiliently deformable material and the bottom portion protrusion 42 is connected to the top portion second end 38 over a relatively long length of housing, the material also being relatively rigid, the housing can deform to absorbs loads such as shocks and vibrations. This deformation occurs principally in the top portion of the rear handle with deflection of the second end 38 occurring. Thus, the top portion 24 of the rear handle 22 is adapted to at least partially deflect to reduce vibrations to the hand of an operator on the rear handle 22 during operation of the chain saw 10. Because the first forward end 36 of the top portion 24 is fixedly connected to the remainder of the housing 14 and, the second rearward end 38 is relatively free to at least partially relatively freely deflect from a home position, the rear handle 22 of the present invention allows for adequate control of the chain saw 10 at the rear handle 22, but nonetheless reduces vibrations to an operator's hand on the rear handle by the deflectability of the rear handle 22 due to its cantilevered and deflectable nature. In a preferred embodiment, the spacing between the tops and bottoms of the protrusion 42 and deflection constraint channel 40 is about a ¼ inch each. Also in a preferred embodiment of the invention, the spacing between sidewalls of the protrusion 42 and sidewalls of the deflection constraint channel 40 is about ⅛ of an inch. However, any suitable size spacing may be provided for different types of materials or combination of materials used in the housing and handle.

Figure 4:
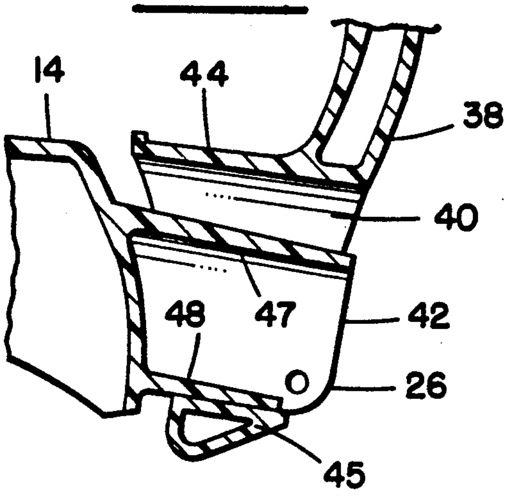
FIG. 4 is a cross-sectional view of the rear handle portion shown in FIG. 2 with the rear handle at a first deflected position relative to the home position shown in FIG. 2.
Figure 5:
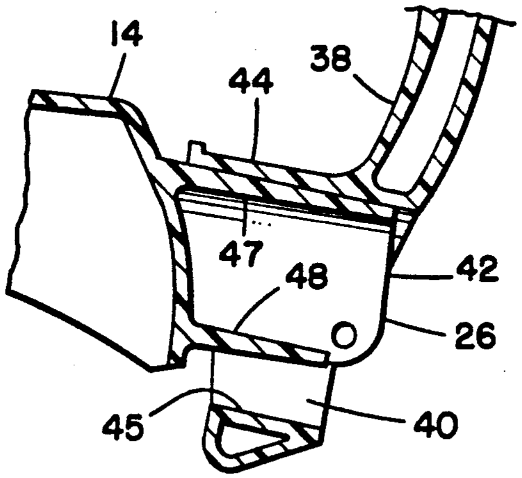
FIG. 5 is a partial cross-sectional view as shown in FIG. 4 with the rear handle at a second reflected position relative to the home position shown in FIG. 2.

Referring also to FIGS. 4 and 5, the deflection constraint or limiter feature of the present invention will be further described. As can be seen with these figures, when the second end 38 of the rear handle is deflected upward equal to the amount of spacing between the constraint channel bottom wall 45 and protrusion bottom wall 48 the two bottom walls 45 and 48 contact each other. With this contact, the protrusion 42, being fixedly connected to the remainder of the housing 14, prevents the second rearward end 38 from further deflection in the upward direction thus preventing the top portion of the rear handle from being over strained from excessive deflection. When the rearward end 38 is deflected in a downward position, an amount equal to the spacing between the constraint channel top wall 44 and protrusion top wall 47, the two top walls 44 and 47 contact each other such that the protrusion 42 prevents the second rearward end 48 from further downward deflection. Thus, the cooperating configuration of the second rearward end 38 with the bottom portion 26 of the rear handle 22 is capable of preventing an overload on the rear handle 22 from excessively deforming the rear handle and thereby damaging the rear handle. In addition to the upward and downward deflection limitations provided, the deflection constraint channel sidewalls 46 and protrusion sidewalls 49 (see FIG. 3) also aid in lateral constraint of the second rearward end 38 such that the second rearward end 38 only has a limited amount of lateral movement.

Generally, vibrations from hand-held power tools occur due to two reasons; internal motor operation and intended use induced vibrations. The internal motor operation generated vibrations, although not too excessive in electric driven tools, can be substantial for a tool having a single cylinder two stroke internal combustion engine. This is because of the constant fast reciprocating action of the piston as well as the additional vibrations caused by other moving parts such as the flywheel, clutch and chain drive. In the chain saw 10 shown in the drawings, as with chain saws in the prior art, the piston and cylinder of the engine 12 are orientated in a relatively vertical orientation. Thus, piston caused vibrations are particularly directed in up and down directions, or perpendicular to the axis of the rear handle 22. The present invention is particularly directed to reduce vibrations in the rear handle directed in this direction perpendicular to the axis of the rear handle in addition to maintaining full control of the constrained cantilevered end. The present invention is also particularly directed to reducing intended use induced vibrations. For a tool such as a chain saw, particularly large vibrations can be generated during intended use, especially with a dull saw chain. These intended use induced vibrations, due to the orientation of the guide bar 16 in a relatively vertical orientation, are also substantially directed in up and down directions, or perpendicular to the axis of the rear handle. Because the rear handle of the present invention is particularly directed to reduce vibrations perpendicular to the axis of the rear handle, intended use induced vibrations are also diminished at the rear handle.

The present invention generally uses a unique configuration of the housing in combination with a substantially rigid but slightly deformable material to provide a simple and inexpensive means for reducing vibrations to an operator in a hand-held tool. Because the unique construction and use of materials is relatively simple, it substantially reduces the number of parts and pieces to the tool, making the tool less expensive. In addition, the present invention substantially reduces manufacturing costs because it takes less time to assemble the tool since it has fewer parts. The resulting tool embodying the present invention can significantly reduce vibrations at the rear handle, but nonetheless also provide for rigid control of tool at the rear handle. Although the present invention has been described as providing a deformable rear handle by use of a material that is substantially rigid, but resiliently deflectable, the present invention can include a composite of members and materials to form the substantially rigid but resiliently deflectable nature of the rear handle. The cross-sectional shape of the rear handle can also affect the deflection of the second end and can be varied accordingly. In the embodiment shown, the top and bottom members of the top portion form a relatively square cross-sectional structural shape. In addition, the cross-sectional shape of the top portion can be varied along its length to obtain the best predictable deformation and deflection to reduce vibrations.

Figure 6B:
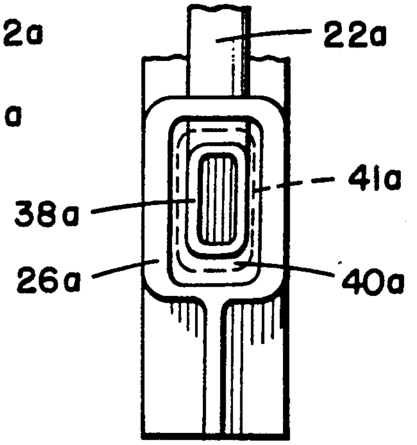

Referring now to FIGS. *6a* and *6b*, there is shown an alternate embodiment of the present invention. In the embodiment shown, the rear handle **22*a* has a second rearward end 38*a* which is provided as a protrusion into a deflection constraint channel 40*a* located inside the rear handle bottom portion 26*a*. This alternate embodiment functions substantially similar to the embodiment shown in FIGS. 1-5. The rearward end 38*a* of the top portion of the rear handle 22*a* is substantially free to deflect, but has only a limited amount of area in which to move. This area of movement is substantially defined by the deflection constraint channel 40*a* of the bottom portion 26*a*. In the embodiment shown the bottom portion 26*a* is integrally formed with a member of the housing main section 15*a*. However, in an alternate embodiment of the invention, the bottom portion 26*a* may be formed separately from the housing main section 15*a* and fixedly connected thereto by means such as screws. In addition, the rearward end 38*a* or the channel 40*a* may also be provided with a suitable resilient vibration absorbing member 41*a*, schematically shown in dashed lines in FIG. 6B, such that when the rearward end 38*a* contacts the inside of the channel 40*a* vibrations from the bottom portion to the rearward end 38*a* are reduced. In addition, the second end 38*a* may be preloaded or prestressed against the upper or lower wall of the channel 40*a*** at a home position.

Referring now to FIG. 7, an alternate embodiment of the present invention is shown. In the embodiment shown, the top portion **24*b* of the rear handle 22*b* has a second rearward end 38*b* with a relatively narrow neck portion 50. The bottom portion 26*b* of the rear handle 22*b*, in the embodiment shown, is provided with a keying slot 52 into which the neck portion 50 of the second end 38*b* can be located. Located on opposite ends of the neck portion 50 are relatively enlarged portions such that the second rearward end 38*b* is relatively free to move in an upward direction and a downward direction in the keying slot 52. However, the enlarged portions of the second rearward end 38*b*, upon contact with the bottom portion 26*b* prevent the top portion 24*b* of the rear handle 22*b* from being overstressed and thereby prevent damage to the top portion 24*b*** from such overstress.

Referring now to FIG. 8, there is shown a partial perspective and cross-sectional view of an alternate embodiment of the present invention. In the embodiment shown, the chain saw or power tool is not provided with a rear handle bottom portion. Instead, in the embodiment shown, the housing **14*c* is provided with a deflection constraint channel at its rear end. The rear handle 22*c* has a second rearward end 38*c* that extends into the constraint channel 40*c*. The constraint channel 40*c* is slightly larger than the second rearward end 38*c* of the rear handle 22*c*. Thus, the second end 38*c* is slightly spaced from the interior walls of the constraint channel 40*c* and can move therein. Hence, the second rearward end 38*c* is relatively free to deflect inside the constraint channel 40*c* such that the rear handle can at least partially deflect in a cantilever type fashion to at least partially absorb vibrations generated by operating the chain saw or power tool and, the location of the second rearward end 38*c*** inside the deflection constraint channel 40c can provide an overload constraint to prevent excessive deflection of and damage to the rear handle 22c. As stated above, conventional tools in the prior art generally use elastomeric isolators and springs to reduce vibrations to the rear handle of a tool. The present invention allows the elimination of the use of elastomeric isolators and springs. This provides three major advantages; the reduction in the amount of time it takes to assemble a tool, the reduction in the cost of manufacturing and assembling the tool, and the production of a more reliable tool because less parts are being used and quality control at assembly is easier.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A chain saw having a motor, a saw chain, a chain guide and a housing, said housing comprising:

- a first body section substantially surrounding said motor; and
- a second rear handle section having a bottom portion, a cantilevered top portion, and means for limiting deflection of said top portion, said top portion being comprised of a substantially rigid, but slightly flexible material and having a first end fixedly connected to said first body section and a relatively free cantilevered second end, said bottom portion being fixedly connected to said first body section, and said means for limiting deflection of said top portion comprising said top portion second end and said bottom portion being suitably positioned relative to each other and being suitably sized and shaped to allow only limited movement of said top portion second end relative to said bottom portion to thereby limit deflection of said top portion second end relative to a home position.

2. A chain saw as in claim 1 wherein said first body section and said second section &op portion are at least partially integrally formed.

3. A chain saw as in claim 1 wherein said first body section and said second section bottom portion are at least partially integrally formed.

4. A chain saw as in claim 1 wherein said top portion has a channel at said second end with a portion of said bottom portion extending thereinto.

5. A chain saw as in claim 4 wherein said bottom portion is spaced from walls of said channel at said home position of said top portion second end.

6. A chain saw as in claim 4 wherein, upon a predetermined amount of deflection of said top portion second end, a wall of said channel contacts said bottom portion to substantially prevent further deflection of said second section.

7. A chain saw as in claim 1 wherein said bottom portion comprises a channel for receiving a portion of said top portion second end therein.

8. A chain saw as in claim 1 wherein said top portion is comprised of a resilient flexible polymer material such that said second end can resiliently deflect from said home position to a contact position with said bottom portion without permanent deformation.

9. A chain saw as in claim 8 wherein said deflection is about 0.125 inch to about 0.26 inch.

10. In a chain saw having a motor, a saw chain, a chain guide and a housing forming a rear handle, wherein the improvement comprises: said rear handle being deflectable in a cantilever-type fashion and having a relatively fixed first end and a cantilevered second end, said second end having a portion cooperable with a portion of said housing for providing a limited but relatively free movement relative thereto in at least two directions such that said second end can deflect from a home position by deformation of said rear handle to at least partially reduce vibrations to an operator's hand grasping said rear handle and, upon contact of said second end with said housing, excessive deformation of said rear handle is prevented to prevent damage to said rear handle whereby said rear handle is relatively simple and inexpensive to manufacture and assemble and also provides reduction of vibrations to the hand of an operator.

11. A housing for use in a hand-held power tool having a motor, said housing being comprised of a molded polymer material and comprising:

- a body section for substantially surrounding the motor of the power tool;
- a cantilever rear handle fixedly connected to said body section at a first end and having a relatively free cantilevered second end, said rear handle being at least partially resiliently deformable in a cantilever-type fashion; and
- means for limiting deformation of said rear handle comprising said second end and a portion of said body section being suitably positioned relative to each other and being suitably sized and shaped to provide for a relative limited movement therebetween such that deflection of said second end relative to a first position has a predetermined limit to limit deformation of said rear handle and, the cantilevered configuration of said rear handle allows vibrations generated during operation of the tool to be reduced at an operator's grasping location on said rear handle.

12. A housing as in claim 11 wherein a portion of said rear handle and a portion of said body section are integrally formed.

13. A housing as in claim 11 wherein said rear handle second end has a channel and said body section portion comprises a projection which extends into said channel.

14. A housing as in claim 11 wherein rear handle is preloaded against said portion of said body section.

15. A housing as in claim 14 wherein a resilient member is located between said rear handle and said portion.

16. A housing as in claim 11 wherein said body section comprises an aperture for receiving a portion of said second end.

* * * * *